United States Patent
Ko et al.

(10) Patent No.: US 9,165,380 B2
(45) Date of Patent: Oct. 20, 2015

(54) IMAGE ENCODING METHOD USING BINARY PARTITION TREE

(71) Applicant: ELECTRONICS AND TELECOMMUNICATIONS RESEARCH INSTITUTE, Daejeon (KR)

(72) Inventors: Eun Jin Ko, Daejeon (KR); Hyun Chul Kang, Daejeon (KR); Sang Wook Park, Chungcheongnam-do (KR); Noh-Sam Park, Daejeon (KR); Mi Kyong Han, Daejeon (KR); Mi Ryong Park, Gyeonggi-do (KR); Jong Hyun Jang, Daejeon (KR); Kwang Roh Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 137 days.

(21) Appl. No.: 13/834,680

(22) Filed: Mar. 15, 2013

(65) Prior Publication Data
US 2013/0279821 A1    Oct. 24, 2013

(30) Foreign Application Priority Data
Mar. 30, 2012 (KR) ........................ 10-2012-0033557

(51) Int. Cl.
| | |
|---|---|
| G06K 9/36 | (2006.01) |
| G06T 9/00 | (2006.01) |
| H04N 19/159 | (2014.01) |
| H04N 19/176 | (2014.01) |
| H04N 19/119 | (2014.01) |
| H04N 19/61 | (2014.01) |
| H04N 19/136 | (2014.01) |

(52) U.S. Cl.
CPC .............. *G06T 9/004* (2013.01); *H04N 19/119* (2014.11); *H04N 19/136* (2014.11); *H04N 19/159* (2014.11); *H04N 19/176* (2014.11); *H04N 19/61* (2014.11)

(58) Field of Classification Search
USPC ................. 382/232, 236, 240, 103, 118, 173; 341/67, 106; 370/521; 348/584, 598; 375/240.2, 240.3, 240.17, E7.056, 375/E7.03, E7.003; 709/247; 710/68; 715/723
See application file for complete search history.

(56) References Cited

U.S. PATENT DOCUMENTS

| | | | | |
|---|---|---|---|---|
| 5,778,190 | A | * | 7/1998 | Agarwal ........................ 709/247 |
| 5,812,788 | A | * | 9/1998 | Agarwal ........................ 709/247 |

(Continued)

FOREIGN PATENT DOCUMENTS

| | | |
|---|---|---|
| KR | 10-0961760 B1 | 5/2010 |
| KR | 1020100081974 A | 7/2010 |

*Primary Examiner* — Anh Do
(74) *Attorney, Agent, or Firm* — Ladas & Parry LLP

(57) ABSTRACT

An image encoding method using a Binary Partition Tree (BPT) includes performing the BPT on a reference frame, detecting blocks, each having a difference in a pixel value exceeding a threshold value in a current frame, based on a result of the BPT of the reference frame, and performing the BPT of the current frame on the detected blocks. In accordance with the present invention, block partition is not applied to all frames, but a partial partition method based on a difference between the pixel values of a reference frame and a current frame to be encoded is provided. Accordingly, the encoding speed within the P frame or the B frame can be improved. Furthermore, the PSNR of a corresponding frame can be maintained within a specific range of the PSNR of a reference frame, and a compression effect can be improved.

20 Claims, 7 Drawing Sheets

(56) References Cited

U.S. PATENT DOCUMENTS

| | | | |
|---|---|---|---|
| 7,296,231 B2 * | 11/2007 | Loui et al. | 715/723 |
| 7,437,697 B2 * | 10/2008 | Venkateswaran et al. | 716/113 |
| 8,150,155 B2 * | 4/2012 | El-Maleh et al. | 382/173 |
| 8,265,349 B2 * | 9/2012 | Wang et al. | 382/118 |
| 8,265,392 B2 * | 9/2012 | Wang et al. | 382/173 |

\* cited by examiner

FIG. 3C
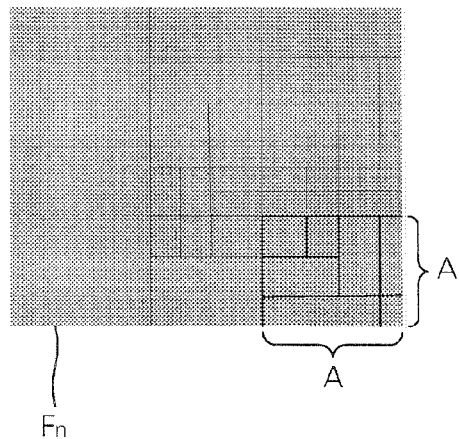
FIG. 3D
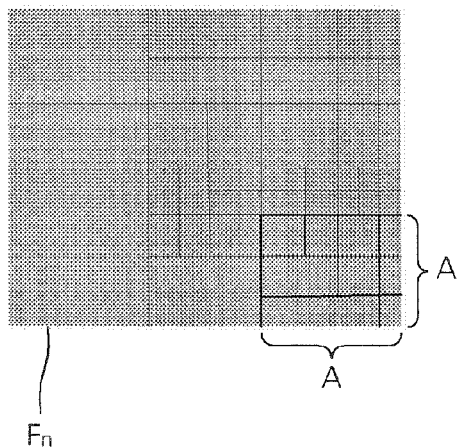
FIG. 4
| FRAME NUMBER | THRESHOLD VALUE | THRESHOLD AMPLITUDE VALUE | FIRST TEMPORARY REPOSITORY | SECOND TEMPORARY REPOSITORY |
|---|---|---|---|---|
| 201 | 202 | 203 | 204 | 205 |

IMAGE ENCODING METHOD USING BINARY PARTITION TREE

CROSS-REFERENCES TO RELATED APPLICATIONS

The present application claims priority under 35 U.S.C. 119(a) to Korean Application No. 10-2012-0033557, filed on Mar. 30, 2012, in the Korean Intellectual Property Office, which is incorporated herein by reference in its entirety set forth in full.

BACKGROUND

Exemplary embodiments of the present invention relate to an image encoding method using a Binary Partition Tree (BPT), and more particularly, to an image encoding method using a BPT in which encoding is performed based on a residual pixel value between frames when variable size partition is performed on a macro block using a BPT within a P or B frame.

In general, in processing a P or B frame in the field of image compression, a method of partitioning a macro block and processing the partitioned macro blocks is various.

First, two tasks are performed if a macro block is partitioned and inter-frame prediction is performed on the partitioned macro blocks.

The first task is a motion vector value processing task of searching for a macro block having the most similar pixel value to a specific macro block and calculating a difference between the positions of the macro block having the most similar pixel value and the specific macro block. The second task is a motion compensation task of calculating a deviation between the pixel values of a macro block to be compressed and a target macro block to be compared.

The motion compensation task is advantageous in that target information to be compressed can be reduced and a compression effect can be increased because only the deviation between pixel values is compressed.

Meanwhile, in the prior art, inter-frame prediction is performed by partitioning the size of a macro block within a P frame into fixed sizes, such as 16*8, 8*16, 8*8, 4*8, 8*4, and 4*4, starting from 16*16. If macro block partition is performed in a variable size manner as described above, a Peak Signal to Noise Ratio (PSNR) value can be maintained and a compression ratio can be improved by about 3.4% to 24.4%.

In the variable size partition of a macro block according to a BPT method, however, there is a problem in that the encoding speed is decreased because a computational load necessary to calculate a reference value is great.

A related prior art includes Korean Patent Laid-Open Publication No. 2010-0081974 (Jul. 16, 2010), entitled 'A Method and An Apparatus For Processing A Video Signal'.

SUMMARY

An embodiment of the present invention relates to an image encoding method using a BPT, which is capable of maintaining the PSNR of a P or B frame within a specific range of the PSNR of a reference frame and also improving the encoding speed when performing variable size partition on a macro block according to a BPT within the P or B frame.

In one embodiment, an image encoding method using a Binary Partition Tree (BPT) includes performing the BPT on a reference frame; detecting blocks, each having a difference in a pixel value exceeding a threshold value in a current frame, based on a result of the BPT of the reference frame; and performing the BPT of the current frame on the detected blocks.

The image encoding method of the present invention further includes generating a block list of the reference frame based on a result of the BPT on the reference frame, after performing the BPT on the reference frame.

In the present invention, the block list includes information on the header of each block and information on the pixel value set of the block.

In the present invention, the information on the header includes a frame number, a block serial number, a block width, a block height, X-axis information on the left top end point of the block, and Y-axis information on the left top end point of the block.

In the present invention, detecting blocks, each having the difference in the pixel value exceeding the threshold value in the current frame, based on a result of the BPT of the reference frame includes calculating the residual pixel value of the current frame by subtracting the pixel value of the current frame from the pixel value of the reference frame; calculating a pixel processing value by subtracting a threshold value from the residual pixel value of the current frame; and comparing the pixel processing value with a specific value and detecting the blocks, each having the pixel processing value equal to or lower than the specific value, based on a result of the comparison.

The image encoding method of the present invention further includes generating a new block list of the detected blocks based on a result of the BPT on the current frame, after performing the BPT on the current frame.

In the present invention, the new block list is combined with an existing block list so that the last block list of the current frame is completed.

The image encoding method of the present invention further includes setting a threshold value again based on a result of the BPT on the current frame and performing the BPT on the current frame again using the set threshold value.

In the present invention, setting the threshold value again based on a result of the BPT on the current frame includes comparing the PSNR value of the current frame with the PSNR value of the reference frame and setting the threshold value again by incorporating a threshold amplitude value into the threshold value if, as a result of the comparison, a difference between the PSNR value of the current frame and the PSNR value of the reference frame exceeds a preset reference range.

BRIEF DESCRIPTION OF THE DRAWINGS

The above and other aspects, features and other advantages will be more clearly understood from the following detailed description taken in conjunction with the accompanying drawings, in which:

FIGS. 3A to 3D are exemplary diagrams illustrating a frame processing method according to a difference between frame pixel values in the image encoding method using a BPT in accordance with one embodiment of the present invention; FIG. 3A is an inputted current frame $F_n$ which is a target to be compressed, FIG. 3B is a result of the BPT of a reference frame $F_{n-1}$, FIG. 3C shows a difference between pixel values exceeding a threshold value in a specific block region A of the current frame $F_n$, and FIG. 3D is a result obtained by applying the BPT for the specific block region A of the current frame $F_n$;

FIG. 4 is an exemplary diagram showing a data structure for performing frame processing in the image encoding method using a BPT in accordance with one embodiment of the present invention;

FIG. 6A is a fore part of the flowchart and FIG. 6B is a rear part of the flowchart.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

The present invention relates to an image encoding method capable of improving the encoding speed through the variable size partition of a macro block according to a Binary Partition Tree (BPT).

Figure 1:
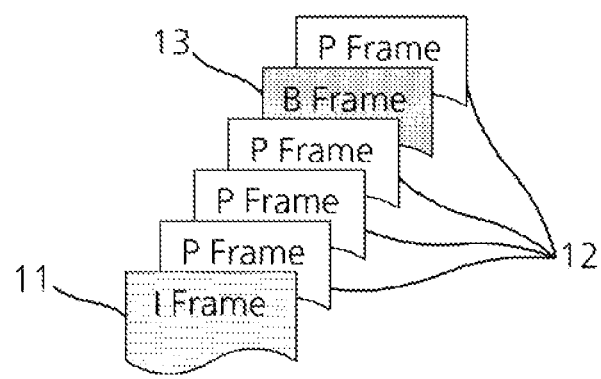
FIG. 1 is an exemplary diagram showing a sequence of images used in image compression.

FIG. 1 is an exemplary diagram showing a sequence of images used in image compression.

In general, type of image used in compression is classified into an I frame 11, a P frame 12, and a B frame 13. An image compression scheme can be divided into a scheme applied to the I frame 11 and a scheme applied to the P frame 12 and the B frame 13.

The I frame 11 functions as an independent image, and it is used as the reference frame $F_{n-1}$ of the P frame 12 and the B frame 13.

A plurality of the P frames 12 can appear consecutively, and the B frame 13 can refer to frames anterior and posterior to the B frame 13.

The characteristics of the I, P, and B frames 11, 12, and 13 are well known in the field of image compression, and a detailed description thereof is omitted.

Figure 2:
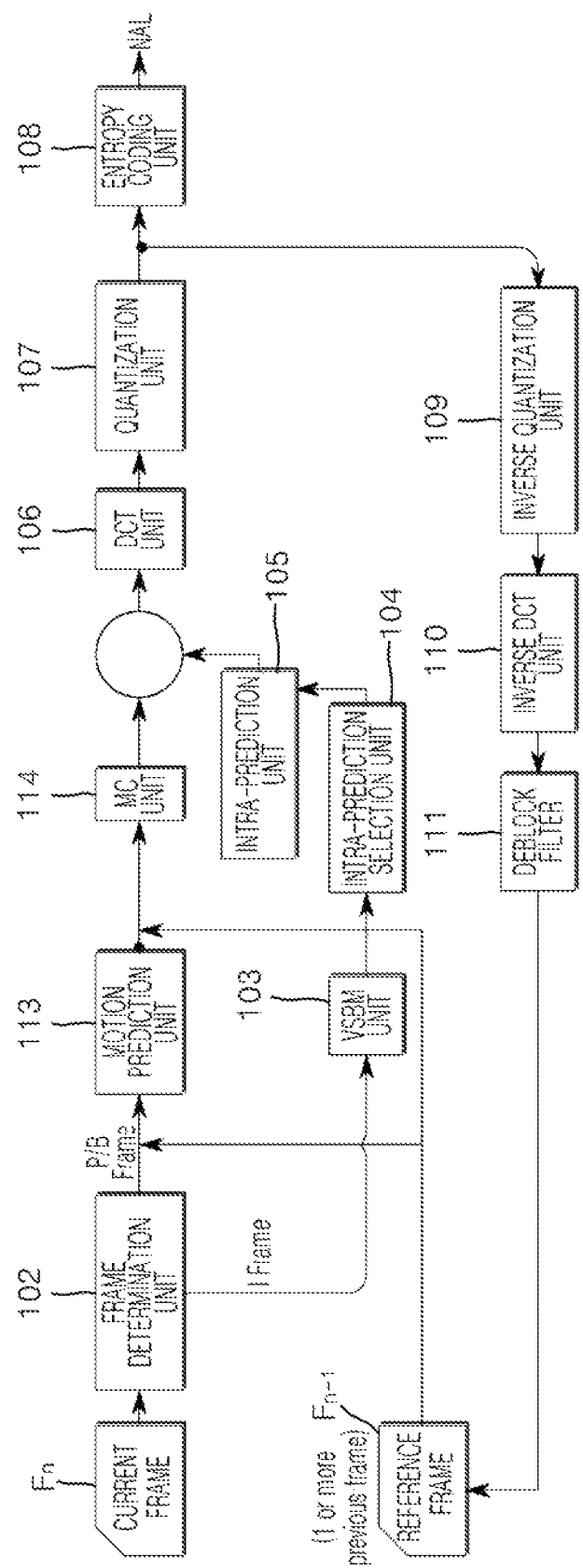
FIG. 2 is a block diagram showing the construction of an apparatus for performing an image encoding method using a BPT in accordance with one embodiment of the present invention.

FIG. 2 is a block diagram showing the construction of an apparatus for performing an image encoding method using a BPT in accordance with one embodiment of the present invention.

As shown in FIG. 2, the apparatus for performing the image encoding method using a BPT in accordance with one embodiment of the present invention includes a frame determination unit 102, a Variable Size Block Matching (VSBM) unit 103, an intra-prediction selection unit 104, an intra-prediction unit 105, a Discrete Cosine Transform (DCT) unit 106, a quantization unit 107, an entropy coding unit 108, an inverse quantization unit 109, an inverse DCT unit 110, a deblock filter 111, a Motion Estimation (ME) unit 113, and a Motion Compensation (MC) unit 114.

First, the frame determination unit 102 reads a current frame Fn when an image is received, determines the type of frame, and stores the type of frame in memory (not shown).

For example, the current frame $F_n$ can be the I frame 11 if the current frame $F_n$ is the start of image compression and can be the P frame 12 or the B frame 13 if image compression has already been started. Here, a processing method differs depending on the type of frame determined by the frame determination unit 102.

If the type of frame determined by the frame determination unit 102 is the I frame 11, the VSBM unit 103 partitions a macro block in a 4*4 size smaller than 16*16 in order to perform intra-prediction.

Next, when intra-prediction applicable to the intra-prediction selection unit 104 is selected, the intra-prediction unit 105 performs the intra-prediction.

Next, compression is performed through the DCT unit 106, the quantization unit 107, and the entropy coding unit 108.

Compression on the I frame 11 is completed though a series of the processes, but a reference frame Fn−1 is generated through the inverse quantization unit 109, the inverse DCT unit 110, and the deblock filter 111 in order to use the reference frame Fn−1 as the reference frame Fn−1 of a next frame.

Furthermore, if the type of frame determined by the frame determination unit 102 is the P frame 12 or the B frame 13, the ME unit 113 compares the P frame 12 or the B frame 13 with the reference frame $F_{n-1}$ and calculates a motion difference based on a result of the comparison. The MC unit 114 compensates for the different.

Next, like in the processing of the I frame 11, compression is performed through the DCT unit 106, the quantization unit 107, and the entropy coding unit 108.

FIGS. 3A to 3D are exemplary diagrams illustrating a frame processing method according to a difference between frame pixel values in the image encoding method using a BPT in accordance with one embodiment of the present invention.

Figure 3A:
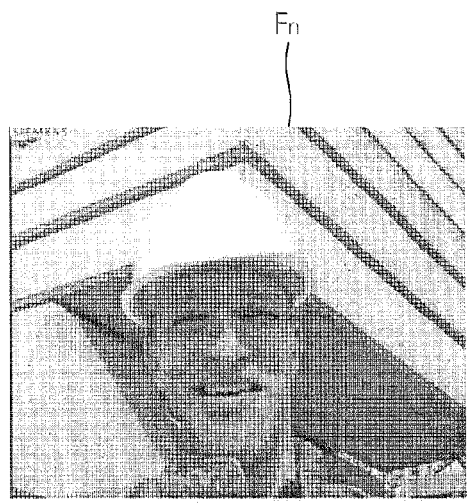
Figure 3B:
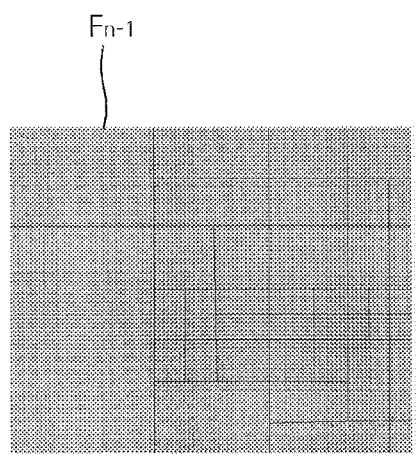

As shown in FIG. 3A, when the P frame 12 or the B frame 13, that is, a target to be compressed, is inputted as a current frame $F_n$, a difference between the pixel values of the current frame $F_n$ and a reference frame $F_{n-1}$ is calculated based on a result (FIG. 3B) of the BPT of the reference frame $F_{n-1}$ and whether or not there is a difference between the pixel values exceeding a threshold value is determined.

As shown in FIG. 3C, if a difference between the pixel values exceeding the threshold value occurs in a specific block region A of the current frame $F_n$, a result obtained by applying the BPT to a result of the BPT (FIG. 3D) again for the specific block region A of the current frame $F_n$ is encoded. Accordingly, the encoding speed can be improved as compared with the case where the BPT is performed on the entire current frame $F_n$.

FIG. 4 is an exemplary diagram showing a data structure for performing frame processing in the image encoding method using a BPT in accordance with one embodiment of the present invention.

FIG. 4 shows the data structure for temporarily storing information necessary for the frame processing described with reference to FIG. 3. As shown in FIG. 4, the data structure can include a frame number 201, a threshold value 202, a threshold amplitude value 203, a first temporary repository 204 for storing a residual pixel value, and a second temporary repository 205 for storing a result obtained by subtracting the threshold value 202 from the residual pixel value.

Here, the residual pixel value means the absolute value of a difference between the pixel values of the reference frame $F_{n-1}$ and the current frame $F_n$, and a result obtained by subtracting the threshold value 202 from the residual pixel value is defined as a 'pixel processing value'.

Furthermore, the threshold value 202 corresponds to the threshold of the residual pixel value between the reference frame $F_{n-1}$ and the current frame $F_n$. The threshold amplitude value 203 corresponds to a value used to increase or decrease the threshold value 202 when setting a set threshold value again.

The threshold value 202 and the threshold amplitude value 203 are set by default, and the threshold value 202 can be changed for each frame.

Figure 5:
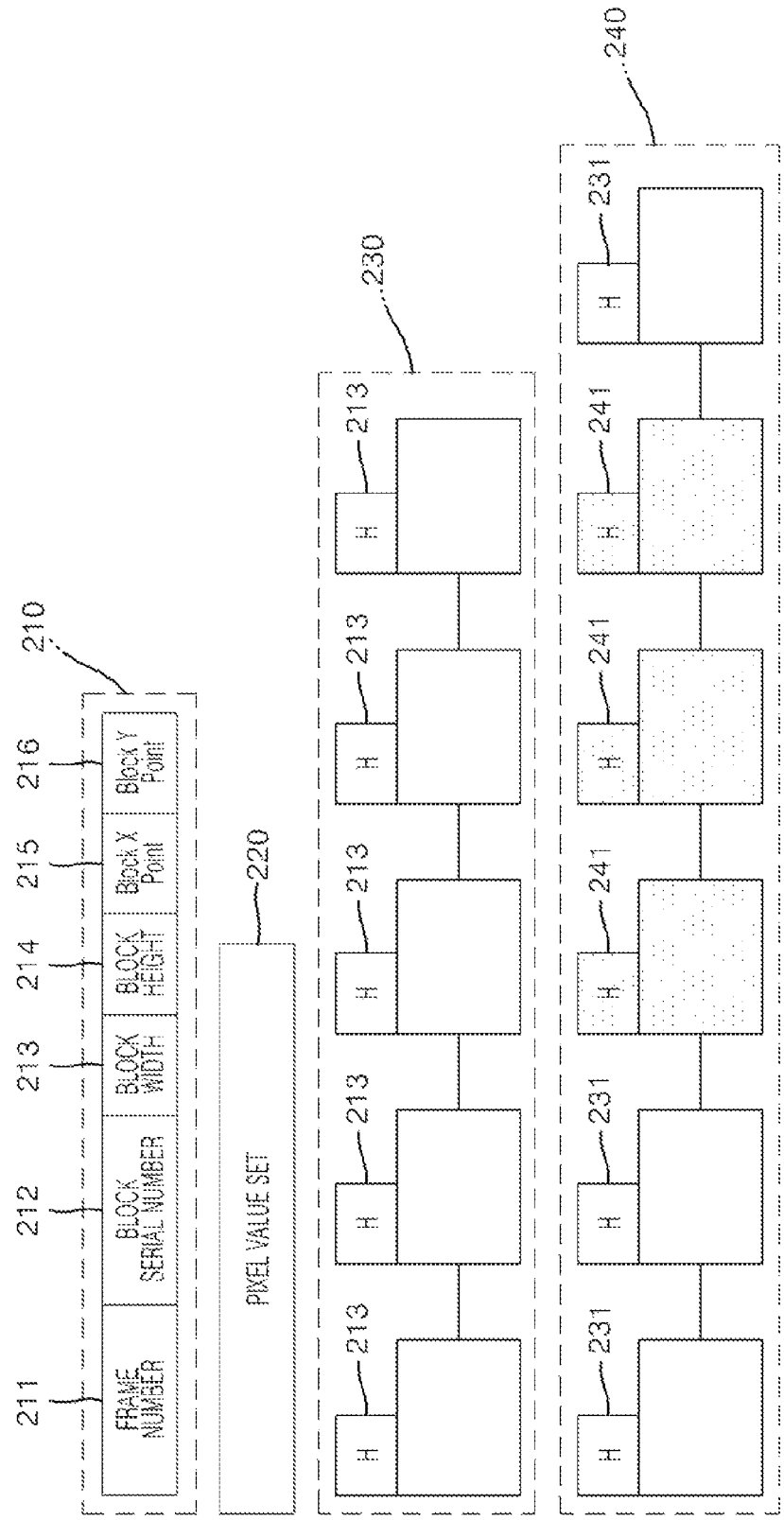
FIG. 5 is an exemplary diagram showing the structure and construction of a block list for frame processing in the image encoding method using a BPT in accordance with one embodiment of the present invention; and A combination of FIG. 6A

FIG. 5 is an exemplary diagram showing the structure and construction of a block list for frame processing in the image encoding method using a BPT in accordance with one embodiment of the present invention.

As shown in FIG. 5, if a current frame $F_n$ is the P frame 12 or the B frame 13, the header 210 of a block list that is generated by performing a BPT on the P frame 12 or the B frame 13 exists in each block. The header 210 is configured to include a frame number 211, a block serial number 212, a block width 213, a block height 214, a Block X Point 215 including X-axis information on the left top end point of the block, and a Block Y Point 216 including Y-axis information on the left top end point of the block.

Here, pieces of pixel value information of each block are stored in a pixel value set 220.

Furthermore, in the block list 230 of a reference frame $F_{n-1}$, blocks are partitioned according to a BPT method, the block lists 231 of the block list 230 are listed, and a difference between the pixel values of a block list 240 of the current frame $F_n$ exceeds a specific range. Accordingly, reconstructed block lists 241 are merged with the existing block lists 231 of the reference frame $F_{n-1}$.

Figure 6A:
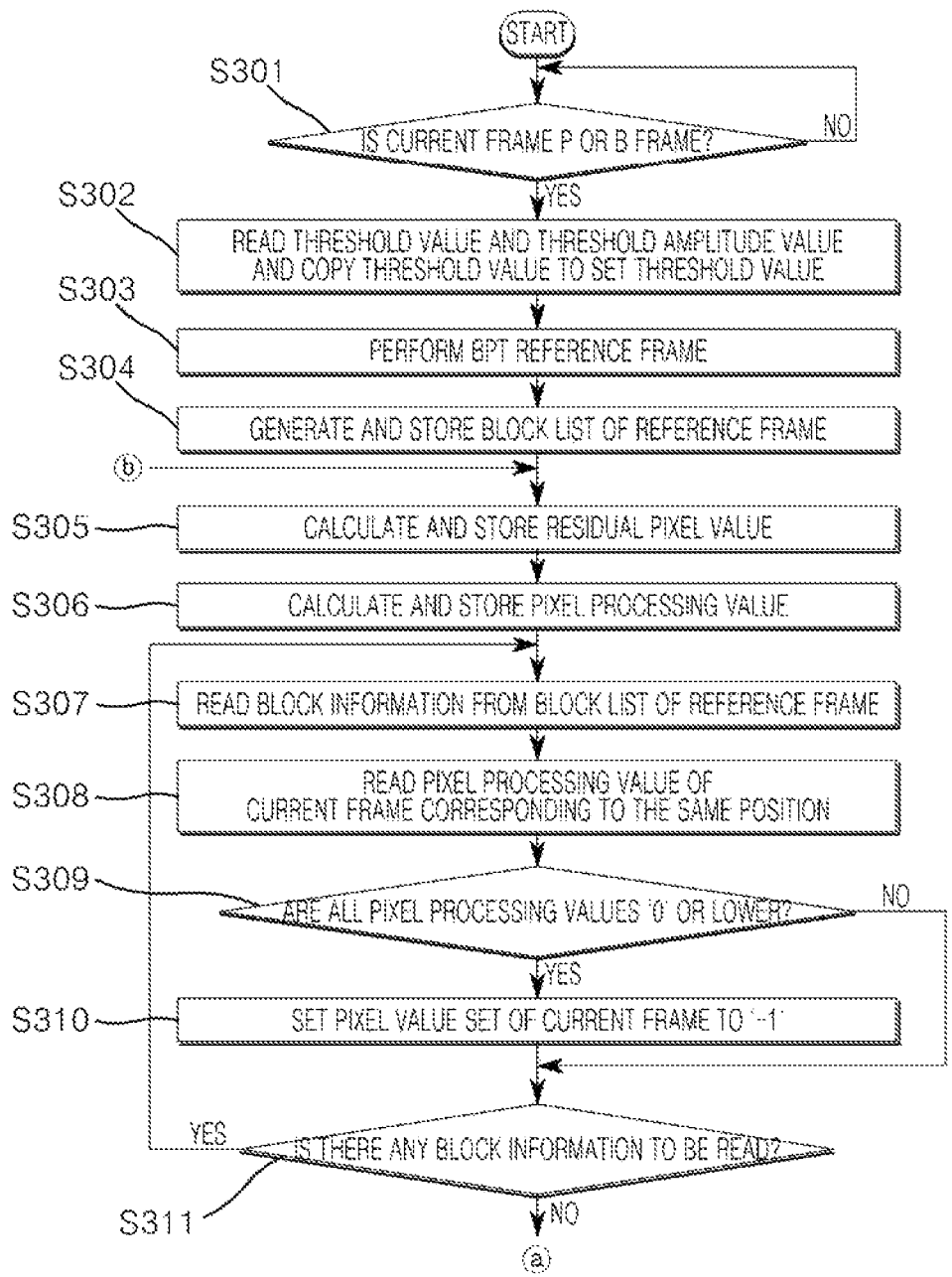
Figure 6B:
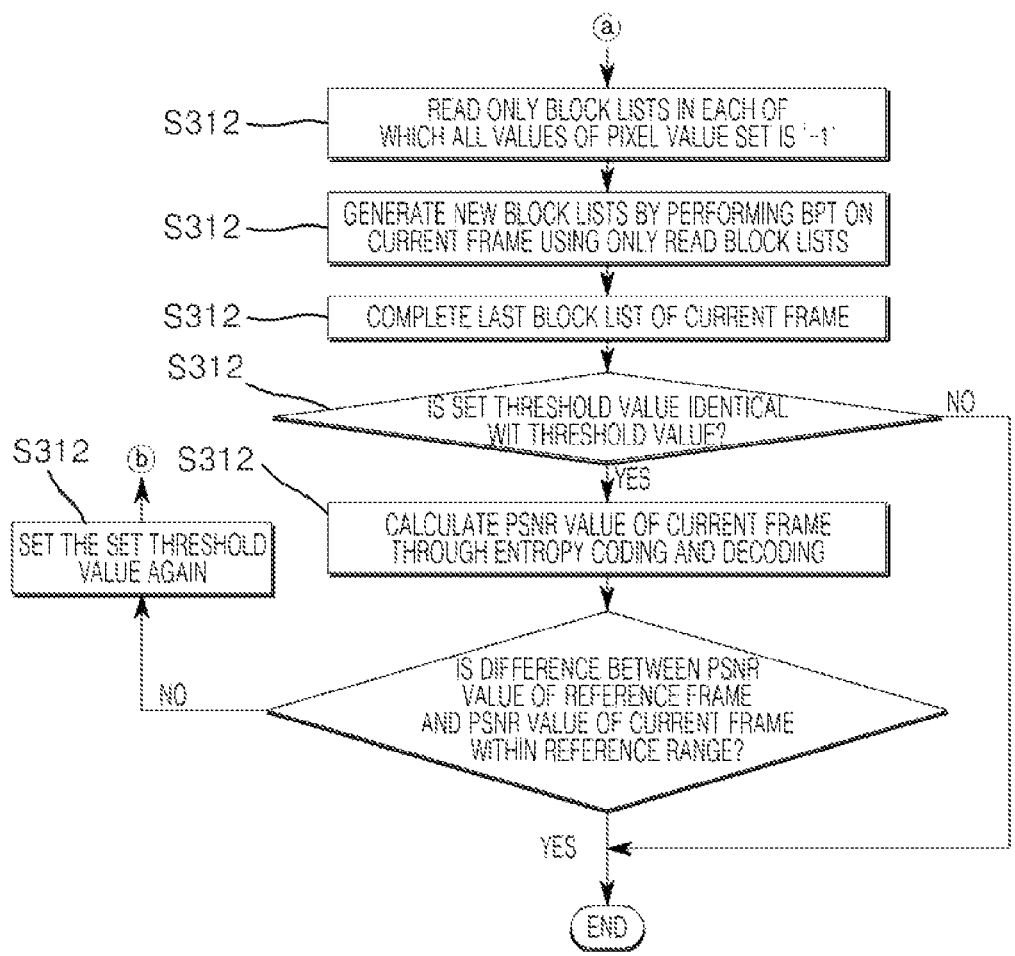
FIG. 6B is a flowchart illustrating an operation of the image encoding method using a BPT in accordance with one embodiment of the present invention.

A combination of FIG. 6A and FIG. 6B is a flowchart illustrating an operation of the image encoding method using a BPT in accordance with one embodiment of the present invention. A detailed operation of the present invention is described below with reference to FIG. 6A and FIG. 6B.

As shown in FIG. 6A and FIG. 6B, first, whether a current frame $F_n$ to be compressed is the P frame 12 or the B frame 13 or not is determined at step S301.

If, as a result of the determination, it is determined that the current frame $F_n$ is the P frame 12 or the B frame 13, the threshold value 202 and the threshold amplitude value 203 are read and the threshold value 202 is copied to a set threshold value stored in the memory (not shown) at step S302.

Next, a variable size block setting function according to the BPT method is performed on a reference frame $F_{n-1}$ at step S303. The block list 230 of the reference frame $F_{n-1}$ is generated based on a result of the execution of the variable size block setting function and is then stored in the memory (not shown) at step S304.

Next, a residual pixel value is calculated by subtracting the pixel value of the current frame $F_n$ from the reference frame $F_{n-1}$. The calculated residual pixel value is stored in the first temporary repository 204 at step S305.

Next, a pixel processing value is calculated by subtracting the set threshold value (i.e., the value to which the threshold value 202 is copied at step S302), stored in the memory (not shown), from the residual pixel value stored in the first temporary repository 204. The calculated pixel processing values is stored in the second temporary repository 205 at step S306.

Next, pieces of information on a block (i.e., the header 210 and the pixel value set 220) are sequentially read from the block list 230 of the reference frame $F_{n-1}$ at step S307. Pixel processing values for the current frame $F_n$ corresponding to the same position as that of the block of the reference frame $F_{n-1}$ are read from the second temporary repository 205 at step S308.

Furthermore, whether all pixel processing values (i.e., the values obtained by subtracting the set threshold value from the residual pixel value) for the current frame $F_n$ are '0' or lower or not is determined at step S309. If, as a result of the determination at step S309, it is determined that all the pixel processing values are '0' or lower, the pixel value set of the current frame $F_n$ corresponding to the information on the block of the reference frame $F_{n-1}$ is set to '−1' at step S310. Next, whether there is any block information to be read or not is checked at step S311.

In contrast, if, as a result of the determination at step S309, it is determined that all the pixel processing values are not '0' or lower, the process returns to step S311 without setting a pixel value set.

If, as a result of the check at step S311, it is checked that there is any block information to be read from the block list 230 of the reference frame $F_{n-1}$, the process returns to step S307 in which information on a block is read from the block list 230 of the reference frame $F_{n-1}$ and information on a next block is read. If there is no more block information to be read by processing information on the last block of the reference frame $F_{n-1}$ through steps S307 to S310 at step S311, only block lists (i.e., a block list having all pixel processing values of '0' or lower) in each of which all values of a pixel value set is '−1' are read at step S312.

New block lists 241 are generated by performing a BPT on the current frame $F_n$ using only the block lists at step S313.

Furthermore, the last block list 240 of the current frame $F_n$ is completed by combining the new block lists 241 with the existing block lists 231 at step S314.

Next, a process of setting the threshold value 202 is performed in order to perform the BPT on the current frame $F_n$, again.

That is, when the last block list 240 for the current frame $F_n$ is completed, the set threshold value copied to the memory (not shown) is compared with the threshold value 202 set by default at step S315. If, as a result of the comparison, the set threshold value is identical with the threshold value 202, it can be determined that the BPT is not performed again.

Accordingly, a PSNR value is calculated by performing entropy coding on the block list 240 of the current frame $F_n$ and decoding the block list 240 at step S316. Whether a difference between the PSNR value of the reference frame $F_{n-1}$ and the PSNR value of the current frame $F_n$ is within a reference range (e.g., −0.7 dB to 0.7 dB) or not is checked at step S317.

If, as a result of the check at step S317, it is checked that the difference between the PSNR value of the reference frame $F_{n-1}$ and the PSNR value of the current frame $F_n$ is not within the reference range, the set threshold value is set again by incorporating the threshold amplitude value 203 into the threshold value 202 at step S318.

More particularly, when the PSNR value of the current frame $F_n$ is smaller than the PSNR value of the reference frame by 0.7 dB or higher, the process returns to step S305 in which a value obtained by subtracting the threshold amplitude value 203 from the threshold value 202 is copied to the set threshold value and a residual pixel value is calculated. Next, the encoding task is performed on the P or B frame again.

In contrast, when the PSNR value of the current frame $F_n$ is greater than the PSNR value of the reference frame $F_{n-1}$ by 0.7 dB or higher, the process returns to step S305 in which a value obtained by adding the threshold amplitude value 203 to the threshold value 202 is copied to the set threshold value and a residual pixel value is calculated. Next, the encoding task is performed on the P or B frame again.

That is, in the present invention, a process of partially partitioning a macro block according to the BPT method based on a difference between the pixel values of frames to be encoded and encoding the partitioned macro blocks is performed again at steps S304 to S314.

Meanwhile, if, as a result of the comparison at step S315, the set threshold value copied to the memory (not shown) is not identical with the threshold value 202 set by default, the encoding task is finished because the set threshold value has already been adjusted.

Furthermore, if, as a result of the check at step S317, it is checked that the difference between the PSNR value of the reference frame $F_{n-1}$ and the PSNR value of the current frame $F_n$ is within the reference range, the encoding task is finished.

As described above, in accordance with the present invention, block partition is not applied to all frames, but a partial partition method based on a difference between the pixel values of a reference frame and a current frame to be encoded is provided. Accordingly, the encoding speed within the P frame or the B frame can be improved.

Furthermore, in accordance with the present invention, the PSNR of a corresponding frame can be maintained within a specific range of the PSNR of a reference frame, and a compression effect can be improved.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A non-transitory computer readable medium (CRM) containing programming instructions that cause a processor to perform a method for: image encoding using a Binary Partition Tree (BPT), comprising:
    performing the BPT on a reference frame;
    detecting blocks, each having a difference in a pixel value exceeding a threshold value in a current frame, based on a result of the BPT of the reference frame;
    performing the BPT of the current frame on the detected blocks; and
    generating a block list of the reference frame based on a result of the BPT on the reference frame, after performing the BPT on the reference frame;
    wherein detecting blocks, each having a difference in a pixel value exceeding a threshold value in a current frame, based on a result of the BPT of the reference frame comprises:
    calculating a residual pixel value of the current frame by subtracting a pixel value of the current frame from a pixel value of the reference frame;
    calculating a pixel processing value by subtracting a threshold value from the residual pixel value of the current frame; and
    comparing the pixel processing value with a specific value and detecting the blocks each having the pixel processing value equal to or lower than the specific value, based on a result of the comparison.

2. The CRM image encoding method of claim 1, wherein the block list comprises information on a header of each block and information on a pixel value set of the block.

3. The CRM image encoding method of claim 2, wherein the information on the header comprises a frame number, a block serial number, a block width, a block height, X-axis information on a left top end point of the block, and Y-axis information on a left top end point of the block.

4. The CRM image encoding method of claim 2, further comprising generating a new block list of the detected blocks based on a result of the BPT on the current frame, after performing the BPT on the current frame.

5. The CRM image encoding method of claim 4, wherein the new block list is combined with an existing block list so that a last block list of the current frame is completed.

6. The CRM image encoding method of claim 1, further comprising:
    setting a threshold value again based on a result of the BPT on the current frame; and
    performing the BPT on the current frame again using the set threshold value.

7. The CRM image encoding method of claim 6, wherein setting the threshold value again based on a result of the BPT on the current frame comprises:
    comparing a Peak Signal to Noise Ratio (PSNR) value of the current frame with a PSNR value of the reference frame; and
    setting the threshold value again by incorporating a threshold amplitude value into the threshold value if, as a result of the comparison, a difference between the PSNR value of the current frame and the PSNR value of the reference frame exceeds a preset reference range.

8. A non-transitory computer readable medium (CRM) containing programming instructions that cause a processor to perform a method for: image encoding using a Binary Partition Tree (BPT), comprising:
    performing the BPT on a reference frame;
    detecting blocks, each having a difference in a pixel value exceeding a threshold value in a current frame, based on a result of the BPT of the reference frame;
    performing the BPT of the current frame on the detected blocks; and
    generating a new block list of the detected blocks based on a result of the BPT on the current frame, after performing the BPT on the current frame;
    wherein detecting blocks, each having a difference in a pixel value exceeding a threshold value in a current frame, based on a result of the BPT of the reference frame comprises:
    calculating a residual pixel value of the current frame by subtracting a pixel value of the current frame from a pixel value of the reference frame;
    calculating a pixel processing value by subtracting a threshold value from the residual pixel value of the current frame; and
    comparing the pixel processing value with a specific value and detecting the blocks, each having the pixel processing value equal to or lower than the specific value, based on a result of the comparison.

9. The CRM image encoding method of claim 8, wherein the new block list is combined with an existing block list so that a last block list of the current frame is completed.

10. The CRM image encoding method of claim 8, further comprising generating a block list of the reference frame based on a result of the BPT on the reference frame, after performing the BPT on the reference frame.

11. The CRM image encoding method of claim 10, wherein the block list comprises information on a header of each block and information on a pixel value set of the block.

12. The CRM image encoding method of claim 11, wherein the information on the header comprises a frame number, a block serial number, a block width, a block height, X-axis information on a left top end point of the block, and Y-axis information on a left top end point of the block.

13. The CRM image encoding method of claim 8, further comprising:
    setting a threshold value again based on a result of the BPT on the current frame; and performing the BPT on the current frame again using the set threshold value.

14. A non-transitory computer readable medium (CRM) containing programming instructions that cause a processor to perform a method for: image encoding using a Binary Partition Tree (BPT), comprising:
  performing the BP I on a reference frame;
  detecting blocks, each having a difference in a pixel value exceeding a threshold value in a current frame, based on a result of the BPT of the reference frame;
  performing the BPT of the current frame on the detected blocks; and
  setting a threshold value again based on a result of the BPT on the current frame; and
  performing the BPT on the current frame again using the set threshold value;
  wherein detecting blocks, each having a difference in a pixel value exceeding a threshold value in a current frame, based on a result of the BPT of the reference frame comprises:
  calculating a residual pixel value of the current frame by subtracting a pixel value of the current frame from a pixel value of the reference frame;
  calculating a pixel processing value by subtracting a threshold value from the residual pixel value of the current frame; and
  comparing the pixel processing value with a specific value and detecting the blocks each having the pixel processing value equal to or lower than the specific value, based on a result of the comparison.

15. The CRM image encoding method of claim 14, wherein setting the threshold value again based on a result of the BPT on the current frame comprises:
  comparing a Peak Signal to Noise Ratio (PSNR) value of the current frame with a PSNR value of the reference frame; and
  setting the threshold value again by incorporating a threshold amplitude value into the threshold value if, as a result of the comparison, a difference between the PSNR value of the current frame and the PSNR value of the reference frame exceeds a preset reference range.

16. The CRM image encoding method of claim 14, further comprising generating a block list of the reference frame based on a result of the BPT on the reference frame, after performing the BPT on the reference frame.

17. The CRM image encoding method of claim 16, wherein the block list comprises information on a header of each block and information on a pixel value set of the block.

18. The CRM image encoding method of claim 17, wherein the information on the header comprises a frame number, a block serial number, a block width, a block height, X-axis information on a left top end point of the block, and Y-axis information on a left top end point of the block.

19. The CRM image encoding method of claim 14, further comprising generating a new block list of the detected blocks based on a result of the BPT on the current frame, after performing the BPT on the current frame.

20. The CRM image encoding method of claim 19, wherein the new block list is combined with an existing block list so that a last block list of the current frame is completed.

* * * * *